US011265602B2

(12) United States Patent
Malhotra et al.

(10) Patent No.: US 11,265,602 B2
(45) Date of Patent: Mar. 1, 2022

(54) SYSTEMS AND METHODS FOR EVALUATING A PROMOTIONAL CAMPAIGN

(71) Applicant: Rovi Guides, Inc., San Jose, CA (US)

(72) Inventors: Girdhar Malhotra, San Jose, CA (US); Jigar Shah, Malden, MA (US); Tiffany Boorsma, Grand Rapids, MI (US); Alexis Yelton, Seattle, WA (US); Michael Helgeson, Sudbury, MA (US); Ezra Velazquez, Cambridge, MA (US); Lisa Lutz, Sudbury, MA (US); Abhijeet Sharma, Seattle, WA (US); William Griffin Cherry, Roslindale, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/353,340

(22) Filed: Mar. 14, 2019

(65) Prior Publication Data
US 2019/0320223 A1 Oct. 17, 2019

Related U.S. Application Data

(60) Provisional application No. 62/656,653, filed on Apr. 12, 2018.

(51) Int. Cl.
*H04N 21/442* (2011.01)
*G06Q 30/02* (2012.01)
(Continued)

(52) U.S. Cl.
CPC ...... *H04N 21/44204* (2013.01); *G06Q 30/0246* (2013.01); *G06Q 30/0269* (2013.01);
(Continued)

(58) Field of Classification Search
CPC .......... H04N 21/44204; H04N 21/472; H04N 21/812; H04N 21/4532; H04N 21/6582;
(Continued)

(56) References Cited

U.S. PATENT DOCUMENTS 6,029,176 A * 2/2000 Cannon ................. G06Q 30/02
6,239,794 B1 5/2001 Yuen
(Continued)

*Primary Examiner* — An Son P Huynh
(74) *Attorney, Agent, or Firm* — Haley Guiliano LLP

(57) ABSTRACT

Systems and methods are disclosed for evaluating promotional campaigns. The system estimates a target conversion rate for an advertising campaign for a media asset and determines an actual conversion rate for the advertising campaign. The system, in response to determining that the target conversion rate and the actual conversion rate are similar, determines a target demographic audience for the target conversion rate. The system determines a primary demographic audience for the actual conversion rate and compares a first characteristic of the target demographic audience and a second characteristic of the primary demographic audience. Responsive to the determination that the target demographic audience and the primary demographic audience are different, the system generates for display a notification indicating that the target demographic audience and the primary demographic audience are different.

5 Claims, 3 Drawing Sheets

(51) Int. Cl.
  *H04N 21/472* (2011.01)
  *H04N 21/81* (2011.01)
  *H04N 21/45* (2011.01)

(52) U.S. Cl.
  CPC ....... *H04N 21/4532* (2013.01); *H04N 21/472* (2013.01); *H04N 21/812* (2013.01)

(58) Field of Classification Search
  CPC ............. H04N 21/252; G06Q 30/0246; G06Q 30/0269
  See application file for complete search history.

(56) References Cited

U.S. PATENT DOCUMENTS

| | | | |
|---|---|---|---|
| 6,564,378 B1 | 5/2003 | Satterfield | |
| 7,165,098 B1 | 1/2007 | Boyer | |
| 7,434,242 B1* | 10/2008 | Goode | H04N 7/17336 |
| | | | 348/E5.008 |
| 7,761,892 B2 | 7/2010 | Ellis | |
| 8,046,801 B2 | 10/2011 | Ellis | |
| 8,607,295 B2* | 12/2013 | Bhatia | H04N 21/2668 |
| | | | 725/133 |
| 8,660,895 B1 | 2/2014 | Saurabh | G06Q 30/0204 |
| | | | 705/14.42 |
| 8,671,423 B1* | 3/2014 | Chang | H04N 21/6582 |
| | | | 725/29 |
| 8,700,465 B1 | 4/2014 | Liu | G06Q 30/0241 |
| | | | 705/14.52 |
| 9,418,366 B1* | 8/2016 | Mayers | G06Q 30/0273 |
| 9,420,320 B2* | 8/2016 | Doe | H04N 21/25841 |
| 9,838,755 B1 | 12/2017 | Kodige | H04N 21/812 |
| 9,854,326 B1* | 12/2017 | Liassides | G06Q 30/0241 |
| 9,992,553 B2* | 6/2018 | Bennett | H04N 21/812 |
| 10,075,756 B1* | 9/2018 | Karunanithi | H04N 21/812 |
| 10,296,936 B1* | 5/2019 | Saurabh | G06Q 30/0246 |
| 10,708,654 B1* | 7/2020 | Moraghan | H04N 21/25866 |
| 10,841,257 B1* | 11/2020 | Bragdon | G06N 20/00 |
| 2002/0056087 A1* | 5/2002 | Berezowski | H04N 21/6125 |
| | | | 725/9 |
| 2002/0174430 A1 | 11/2002 | Ellis | |
| 2003/0067554 A1* | 4/2003 | Klarfeld | H04N 21/26283 |
| | | | 348/461 |
| 2003/0145323 A1* | 7/2003 | Hendricks | H04N 21/8146 |
| | | | 725/34 |
| 2005/0149964 A1* | 7/2005 | Thomas | H04N 21/4532 |
| | | | 725/9 |
| 2005/0251827 A1 | 11/2005 | Ellis | |
| 2006/0026067 A1* | 2/2006 | Nicholas | G06Q 30/00 |
| | | | 705/14.58 |
| 2007/0136753 A1* | 6/2007 | Bovenschulte | H04N 21/478 |
| | | | 725/46 |
| 2008/0300957 A1* | 12/2008 | Hirai | G06Q 30/02 |
| | | | 705/14.41 |
| 2009/0099902 A1* | 4/2009 | Chatter | G06Q 30/0275 |
| | | | 705/14.43 |
| 2009/0132346 A1* | 5/2009 | Duggal | G06Q 30/0204 |
| | | | 705/7.33 |
| 2009/0313113 A1* | 12/2009 | Dye | G06Q 30/02 |
| | | | 705/14.42 |
| 2010/0146542 A1* | 6/2010 | Weihs | H04N 21/2668 |
| | | | 725/34 |
| 2010/0153885 A1 | 6/2010 | Yates | |
| 2010/0332439 A1* | 12/2010 | Adachi | G06Q 30/02 |
| | | | 706/52 |
| 2011/0016479 A1* | 1/2011 | Tidwell | H04H 20/103 |
| | | | 725/9 |
| 2011/0288907 A1* | 11/2011 | Harvey | G06Q 30/02 |
| | | | 705/7.29 |
| 2011/0295700 A1* | 12/2011 | Gilbane | G06Q 30/00 |
| | | | 705/14.71 |
| 2012/0158461 A1* | 6/2012 | Aldrey | G06Q 30/0257 |
| | | | 705/7.35 |
| 2012/0192214 A1* | 7/2012 | Hunn | H04N 21/25891 |
| | | | 725/9 |
| 2012/0310728 A1* | 12/2012 | Kagan | G06Q 30/02 |
| | | | 705/14.43 |
| 2013/0080264 A1* | 3/2013 | Umeda | G06Q 30/02 |
| | | | 705/14.69 |
| 2014/0100944 A1* | 4/2014 | Zhu | G06Q 30/0275 |
| | | | 705/14.41 |
| 2014/0196081 A1* | 7/2014 | Emans | G06Q 30/0244 |
| | | | 725/32 |
| 2014/0304069 A1* | 10/2014 | Lacey | G06Q 30/0249 |
| | | | 705/14.48 |
| 2015/0088635 A1* | 3/2015 | Maycotte | G06Q 30/0244 |
| | | | 705/14.43 |
| 2015/0213389 A1* | 7/2015 | Modarresi | G06Q 10/06393 |
| | | | 705/7.39 |
| 2016/0050129 A1* | 2/2016 | Hoyne | G06F 16/95 |
| | | | 709/224 |
| 2016/0117720 A1* | 4/2016 | Hood | H04N 21/25891 |
| | | | 705/14.43 |
| 2016/0134934 A1* | 5/2016 | Jared | G06Q 30/0203 |
| | | | 725/14 |
| 2016/0267497 A1* | 9/2016 | Li | G06Q 50/01 |
| 2017/0034591 A1* | 2/2017 | Ray | G06Q 30/0269 |
| 2017/0104874 A1* | 4/2017 | Yi | H04M 3/5175 |
| 2017/0127107 A1* | 5/2017 | Kar | H04N 21/2547 |
| 2017/0132553 A1* | 5/2017 | Theirl | G06Q 10/06393 |
| 2017/0161772 A1* | 6/2017 | Xu | G06N 3/08 |
| 2018/0084310 A1* | 3/2018 | Katz | G06Q 30/0242 |
| 2018/0152760 A1* | 5/2018 | Venetucci | H04N 21/4756 |
| 2018/0189821 A1* | 7/2018 | Masson | G06Q 30/0246 |
| 2018/0249214 A1* | 8/2018 | Sullivan | H04N 21/25891 |
| 2018/0361254 A1* | 12/2018 | Anderson | A63F 13/335 |
| 2019/0303964 A1* | 10/2019 | Barbier | G06Q 30/0275 |
| 2019/0364325 A1* | 11/2019 | Anderson | H04N 21/25883 |
| 2020/0153805 A1* | 5/2020 | Sen | H04L 65/4084 |

* cited by examiner

SYSTEMS AND METHODS FOR EVALUATING A PROMOTIONAL CAMPAIGN

CROSS-REFERENCE TO RELATED APPLICATION

This is a non-provisional application of U.S. Provisional Application No. 62/656,653, filed Apr. 12, 2018, which is hereby incorporated by reference herein in its entirety.

BACKGROUND

Promotion of media programs is commonly performed using advertisements or other promotional campaigns. Planners may wish to understand and evaluate how media campaigns performed or are performing in order to improve an ongoing or future campaign. There are numerous variables to consider in a media campaign, for example, the campaign message, artwork, distribution avenue, target audience, timing, and other variables. Measuring and evaluating an effect of each variable on the campaign outcome is difficult because there are many data points and behaviors that may or may not be interrelated.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 3:
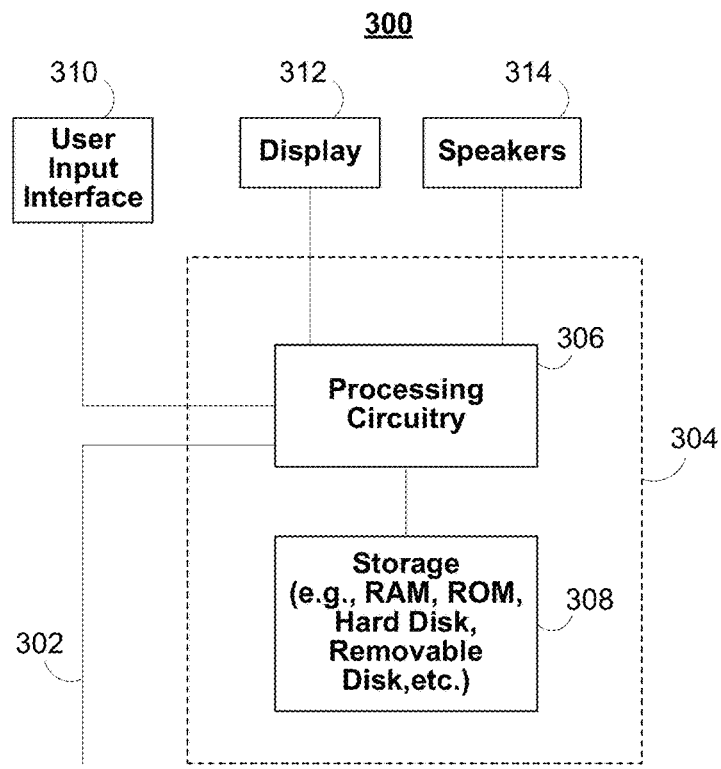
FIG. 3 is a block diagram of an illustrative user equipment device in accordance with some embodiments of the disclosure.

Systems and methods are described herein for evaluating a promotional campaign. The promotional campaign may be a campaign for a media asset and may include, for example, advertising or other promotional elements. In an example, methods a systems may be performed using a media guidance application, which may be implemented on user equipment (300 FIG. 3) and executed using control circuitry (e.g., 304 (FIG. 3)) to generate a display of performance metrics for a campaign via a user interface ("UI", which may be presented in a display 312 on user equipment 300 (FIG. 3)) to show campaign information, such as conversion (which may be a number of viewers who saw the campaign and then viewed the associated media program), reach (which may indicate the viewers who may have seen the campaign), as well as a conversion rate, and percentage of a target or selected audience reached by the campaign. A media guidance application may be used to generate the user interface may be used to generate a report including performance metrics. The data used by the media guidance application to evaluate the promotional campaign may be obtained from a media guidance data source, e.g., 418 (FIG. 4) or other source. In addition, the media guidance application may access viewer viewing information based on interactions, for example via a user input interface 310 (FIG. 3) by a user using user equipment 300 (FIG. 3).

The UI generated by the media guidance application may include variables for evaluating a campaign, for example, advertisement spot duration (10, 20, 30 seconds), day of week, part of the day (morning, primetime, late night, overnight, etc.), channel or network (ABC, NBC, etc.), frequency of views (viewers who watched more than one promotion in a campaign), campaign creative content information, or other information that will provide a user with information indicating variables or campaign options that are effective for converting viewers. The UI information may be generated by the media guidance application to be shown as percentages (i.e., conversion rates), as well as absolute values (i.e., a number of conversions) and can be normalized for various factors. The campaign information may be generated in a display by the media guidance application in a number of ways so the numbers and values can be easily visualized. For example, the information may be displayed in the UI as values or bar charts with indicators showing statistical significance. The indicators may be presented in different colors or with visible markings so that users can see significant events or occurrences, such as increased conversions, which may have occurred because of campaign strategies or other factors.

The media guidance application may generate the user interface to include time series data that may indicate time measurements, such as day-by-day (or week-by-week, etc.) over the course of the campaign. The time series data may be generated for display in the UI by the media guidance application as a bar chart or using numbers, in a manner that may help the user determine if a duration of a campaign was too long or too short.

The media guidance application may present data in the user interface that can be summarized and provided in a manner that highlights information that may be statistically significant. For example, the media guidance application may generate the user interface to include a highlight of portions of a campaign that are the most successful and least successful. The information may be aggregations of data points (days of week, dayparts, etc.) for the campaign. The UI display generated by the media guidance application, for example in UI 312 (FIG. 3), may also present information indicating a conversion rate, i.e., audience that have seen a promotion and then accessed a media item associated with the promotion, as well as a percent of a total audience reached of a target audience. For example, user equipment, e.g., 402, 404, 406 (FIG. 4) may be used by the viewer to access the promotion and the media item and the media guidance application may track such access. Demographic information may be included in the user interface and may be presented in a manner relevant to the target audience. This information may allow the user to determine if a campaign targeted the correct or a suitable audience. For example, if a target audience conversion rate for a particular media item is higher than a conversion rate for a core demographic for the media item, the target audience may have been made up of likely viewers of the program and was thus a good target. However, if the conversion rate for a core demographic for a media item is higher than a conversion rate for a targeted audience in a campaign, then the target audience may not have been a suitable target audience. In this case, the media guidance application may generate a display for the user interface to present the information in a manner that highlights this problem and may allow the user to adjust variables in the campaign to improve a conversion rate, for example, by changing parameters for the target audience using a user input interface (310 (FIG. 3)).

The user interface may also be generated by the media guidance application to have options for a user to choose filters in a display 312 (FIG. 3) for the campaign data using a user input interface (310 (FIG. 3)). For example, a user could select filters to present results for a particular target audience or all households (or types of audiences). Other filters may include, for example, networks or distribution points, days of the week, dayparts, creatives or content types, spot durations, or any other aggregation of data choices.

Campaign evaluation may be provided using data analysis using a statistical or machine learning model designed to predict conversions based on campaign data. The model may be run and executed using control circuitry 304 (FIG. 3) for user equipment 300 (FIG. 3) on which a media guidance application may be implemented. A user, via the user interface generated by the media guidance application, may change values of variables used in the model to increase conversions or reach or other aspect of the campaign. For example, a user may increase a number of spots placed per week or placed in specific weeks and control circuitry for a processor executing the model may determine whether such changes may increase or otherwise affect a number of conversions, or a conversion rate. In some scenarios, the media guidance application may have settings for target rates and automatically adjust the variables for the model to achieve such targets. Such settings and changes may be summarized and presented in a display by the media guidance application for use by a viewer.

Figure 4:
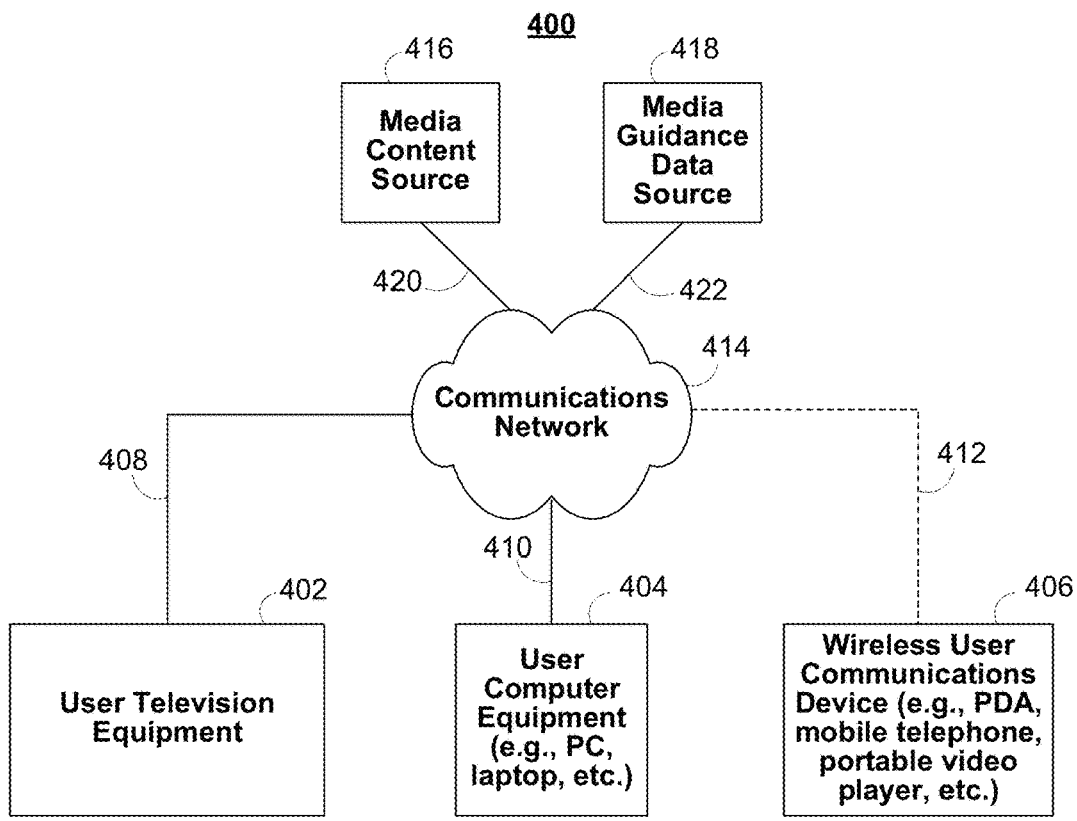
FIG. 4 is a block diagram of an illustrative media system in accordance with some embodiments of the disclosure.

Systems and methods may be provided for evaluating a promotional campaign. The promotional campaign may be a promotion for a media asset, such as an advertising campaign. The system may include a media guidance application that may have a processor 306 (FIG. 3) and control circuitry 304 (FIG. 3) that may be configured to handle media data (which may be obtained from data source 418 (FIG. 4) and analyze viewer behavior. The media guidance application may be used to evaluate the campaign using viewer information and media data from a media database (e.g., data source 418 (FIG. 4)) that may include various media related data for media categories, as well as viewer behavior, demographics and other media data. Some databases may be data source 418 (FIG. 4).

The media guidance application may be configured to estimate a target conversion rate for an advertising campaign for a media asset. In an example, a media asset may be promoted to a general or certain target audience using a promotional or advertising campaign. A conversion rate measures viewers or audience members that view an advertisement and then accesses a media asset associated with the advertisement. A standard or estimated conversion rate may be used for the campaign. The rate may be based on a goal benchmark or other standard.

The media guidance application may be used to determine, based on viewer access of the advertising campaign and the media asset, an actual conversion rate for the advertising campaign. Thus, the media guidance application may receive information from viewing histories of viewers (e.g., data source 418 (FIG. 4)) indicating that a viewer or viewers have viewed an advertisement and information indicating which of such viewers may have accessed the associated media asset to obtain the actual conversion rate. The viewer information may be obtained, for example, using user viewing history information and metadata for content presented to a viewer.

The media guidance application may determine or compare whether the estimated target conversion rate and the actual conversion rate are similar. Generally speaking, if the rates are similar, the forecast or predicted conversion rates may have been predicted accurately and the actual rates will arise as expected or hoped. However, if the rates are different, the promotional campaign may have encountered some challenges. However, even if the rates are similar, information about the actual viewers may be obtained by the media guidance application to ensure that the campaign reached suitable viewers and caused the viewers to access the media asset.

When the target conversion rate and the actual conversion rate are determined to be similar by the media guidance application, the media guidance application may determine or identify characteristics of a target demographic audience for the target conversion rate. The demographic information may have been used by the media guidance application in the estimation of the target conversion rate and may be available to the media guidance application from a cache memory, e.g., 308 (FIG. 3). In some scenarios, the demographic information may be obtained from a media database, such as data source 418 (FIG. 4).

The media guidance application may also obtain user information about the viewers that viewed the media asset, which were used to determine the actual conversion rate. The user information may include user demographic information, e.g., household location, type of viewer, preferences and/or other typical user information. The viewer information may be aggregated to obtain overarching or common characteristics of the viewers that accessed the media item. The viewer information may be received by the media guidance application from, for example, data source 418 (FIG. 4). Based on the viewer information, the media guidance application may determine a primary demographic audience for the actual conversion rate. For example, the media guidance application may aggregate information for all of the viewers and determine a common characteristic for the viewers.

The media guidance application may compare a first characteristic of the target demographic audience and a second characteristic of the primary demographic audience. The comparison may be performed by media guidance application to determine whether the target demographic and the actual viewing audience have characteristics in common, meaning, for example, that the targeted demographic for the media asset is similar to the demographic for the actual viewers. On the other hand, the media guidance application may determine that the target demographic audience and the demographic of the actual viewing audience are different.

If the media guidance application determines, based on the comparison of the first characteristic and the second characteristic, that the target demographic audience and the primary demographic audience are different, this may indicate that there was a mismatch between the campaign target because the conversion of viewers was for viewers that were not in the target demographic.

Accordingly, in response to the media guidance application determining that the target demographic audience and the primary demographic audience are different, the media guidance application may generate for display a notification indicating that the target demographic audience and the primary demographic audience are different. The notification may be generated for display by the media guidance application in display 312 (FIG. 3) of user equipment 300 (FIG. 3). This notification may be viewed by a user of the user interface and serve as an indication that some change may be needed to adjust the promotional campaign. The model embedded in the media guidance application may be executed to generate a suggested target audience, or to automatically adjust a target audience. In some scenarios, the media guidance application may generate a display 312 (FIG. 3) in the user interface including options selectable by the user using input 310 (FIG. 3) to change the target audience. Any changes selected for the target audience via the input 310 (FIG. 3) may be received by the media guidance application which may run the model to determine whether conversions would increase or decrease based on the change to the target audience.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 1:
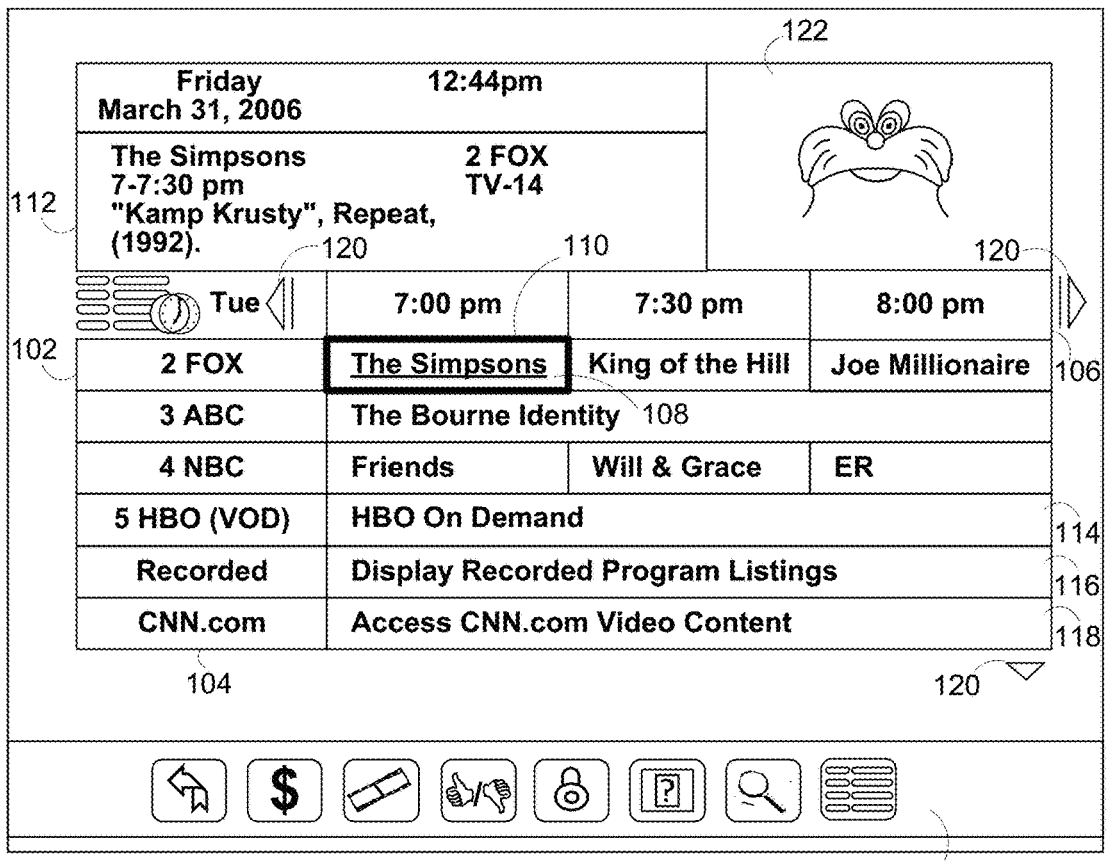
FIG. 1 shows an illustrative example of a media guidance display that may be presented in accordance with some embodiments of the disclosure.
Figure 2:
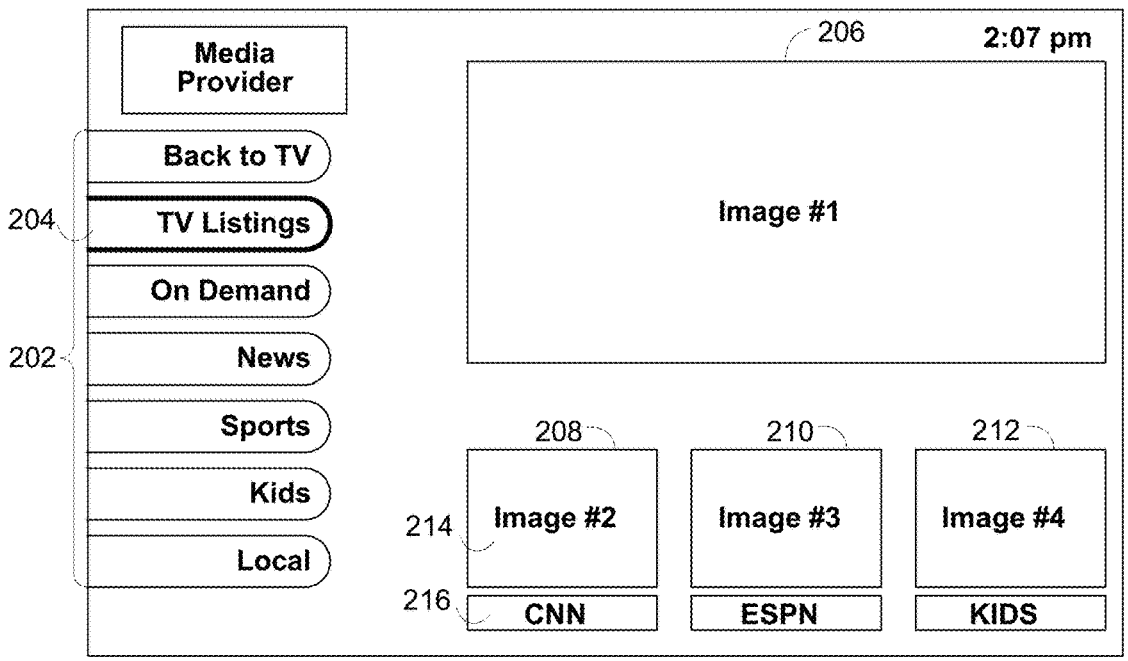
FIG. 2 shows another illustrative example of a media guidance display that may be presented in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the abovementioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 5:
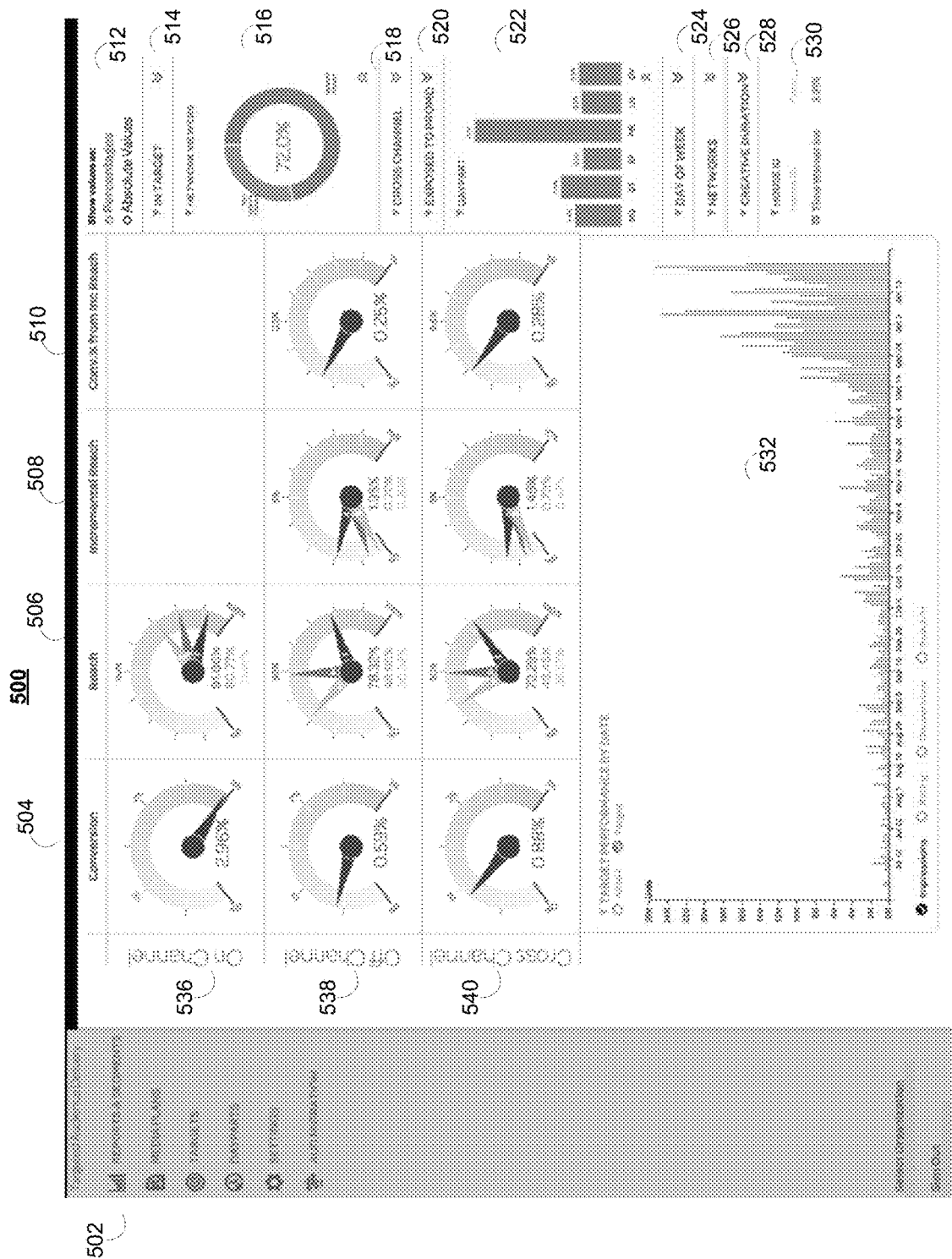
FIG. 5 shows a representative user interface for evaluating a campaign in accordance with some embodiments of the disclosure.

FIG. 5 depicts a representative user interface for evaluating a campaign in accordance with systems and methods described herein. The user interface is illustrative only and shows graphs and charts that may be used to depict information about, for example, promotional campaigns and viewer information, as well as filters for viewing the information. Other filters and data categories may also be used. The user interface may be generated by a media guidance application and displayed in display 312 (FIG. 3) of user equipment 300 (FIG. 3). The content of promotions, advertisements, media and assets may be accessed via media content source 416 (FIG. 4), and media guidance application data may be obtained from 418 (FIG. 4). The data and media content may be transmitted to the user equipment via communication network, e.g., 414 (FIG. 4).

As shown, FIG. 5 depicts a display 500 that may include user configured settings 502 which may be selected to provide reports and segments for certain data, media plans, targets, dayparts, other settings, and migration. The display 500 may be presented in a display 312 (FIG. 3) for user equipment 300 (FIG. 3). The user interface screen 500 may be generated by the media guidance application for use in providing a dashboard that shows campaign details for conversion 504, reach 506, incremental reach 508, and conversion percentage from incremental reach 510. The conversion 504 may indicate which viewers viewed a promotion campaign and then viewed a media asset associated with the promotion campaign. The reach 508 may be the audience that was reached by the campaign, meaning the audience that viewed a promotion. The incremental reach 508 may include additional audience reached with each additional promotion or advertisement event, or conversely, the reduction in audience reached when an advertisement is removed. The conversion rate from the incremental reach 510 may be a rate of viewers that access a media asset for each promotional event. Other similar advertisement or promotional information could also be depicted in the UI 500.

Each of the campaign details (i.e., 504, 506, 508, 510) may be presented in a display (e.g., 312 (FIG. 3)) that is generated by the media guidance application using distribution information. For example, when a promotion is presented on the channel or access point for an associated media item, it is on channel 536 and may have a greater conversion rate than if the promotion is presented on another channel, e.g., off channel 538. However, if the promotion is presented cross channel 540 where it is presented on multiple channels, the conversion rate may be better than only off channel. The media guidance application may track or receive information about which promotions are displayed on which channels and generate the display 500 accordingly.

The campaign information may be presented in the display by the media guidance application in percentages or absolute values based on a selection of an option 512. Other numeric standards could also be used if needed. Other filters or variables may be changed to model a campaign using the menus on the right of the UI 500. For example, target 514 may be selected used by the media guidance application to analyze and establish target audience characteristics in the display. In another example, the media guidance application may display network viewers 516 information, to show that a campaign has been received by network viewers or viewers in the distribution channel. In another example, the media guidance application may analyze off channel viewing in response to selection of menu 518. Viewer information for viewers may be displayed by the media guidance application in user interface 500 for viewers that have viewed a promotional campaign in response to selections and accessed via menu 520.

An evaluation model may be filtered by the media guidance application in response to filter selections to show conversion rates that may have been affected by presenting a campaign during particular dayparts 522, for example morning, day time, early fringe, primetime, late night, overnight, or other daypart. Days of the week may also influence a campaign such that certain viewers may be more likely to access media and promotions on certain days. Such filters may be selected by a user and the media guidance application, in response to such selections, may analyze the campaign information. The media guidance application may filter the campaign evaluation model in response to a selection of week days using the menu 524. Networks or distribution channels may also affect conversion in a campaign because certain distribution avenues may be more suitable for certain demographics and target audiences. The media guidance application may filter the campaign evaluation model in response to a selection of the menu 526 to filter the campaign information for networks. Another filter may be creative duration 528 which may include a length of an advertisement or promotion. It may also be used to refer to an age of an advertisement. The media guidance application may filter the campaign evaluation model in response to a selection of the options for create duration 528. Viewer details may be obtained by the media guidance application in response to a selection of menu 530. Viewer details can include household or subscriber information, if available. The campaign information may be processed by the media guidance application and presented in a display using bar charts 532 to depict performance of a campaign. Other information such as ratings, conversions, and incremental reach may also be shown in a display generated by the media guidance application, for example, by date as a campaign continues. The campaign details, such as reach 506 may be presented by the media guidance application in a display including dials in different colors to highlight different results for different variables.

In some scenarios, the media guidance application may store benchmarks in a cache, e.g. storage 308 (FIG. 3), that may be used to compare different campaigns and performance metrics for the campaigns. The benchmarks may be related to, for example, conversions and reach rates as applied to different demographics and distribution channels. The benchmarks may be used by the media guidance application to analyze on going or provide estimates for future promotional campaigns. The media guidance application may reference such benchmarks in a display of promotional campaigns to provide a reference point for comparing promotional campaigns.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for evaluating a promotional campaign, the computer-implemented method comprising:

determining, using a processing circuitry, based on viewer access of an advertising campaign for a media asset and the media asset, an actual percentage of users who, after viewing an advertisement, view the media asset for the advertising campaign;

determining, using the processing circuitry, a primary demographic audience of users who, after viewing the advertisement, view the media asset for the advertising campaign;

comparing, using the processing circuitry, a target percentage of users who, after viewing the advertisement, view the media asset for the advertising campaign, to the actual percentage of users who, after viewing the advertisement, view the media asset for the advertising campaign;

comparing, using the processing circuitry, a target demographic audience of users to the primary demographic audience of users who, after viewing the advertisement, view the media asset for the advertising campaign;

determining, using the processing circuitry, that a first condition is met, wherein the first condition is that the target percentage of users is similar to the actual percentage of users who, after viewing the advertisement, view the media asset for the advertising campaign;

determining, using the processing circuitry, that a second condition is met, wherein the second condition is that the target demographic audience of users is different than the primary demographic audience of users who, after viewing the advertisement, view the media asset for the advertising campaign; and in response to determining that both the first condition is met and the second condition is met, generating, using the processing circuitry, for display a notification, wherein the notification indicates that the target demographic audience and the primary demographic audience are different.

2. The computer-implemented method of claim 1, wherein the notification also indicates the primary demographic audience.

3. The computer-implemented method of claim 2, wherein the notification comprises a graphical representation of the primary demographic audience and the target demographic audience.

4. The computer-implemented method of claim 1, wherein the notification also indicates the total number of users who, after viewing the advertisement, view the media asset for the advertising campaign.

5. The computer-implemented method of claim 1, wherein the notification also indicates the time frame when the determination, based on viewer access of the advertising campaign and the media asset, of the actual percentage of users who, after viewing an advertisement, view a media asset for the advertising campaign, occurred.

* * * * *